Aug. 31, 1948.                 A. F. ROSS                 2,448,468
                        STEERING STABILIZER
                        Filed Aug. 18, 1945
Fig. 1.
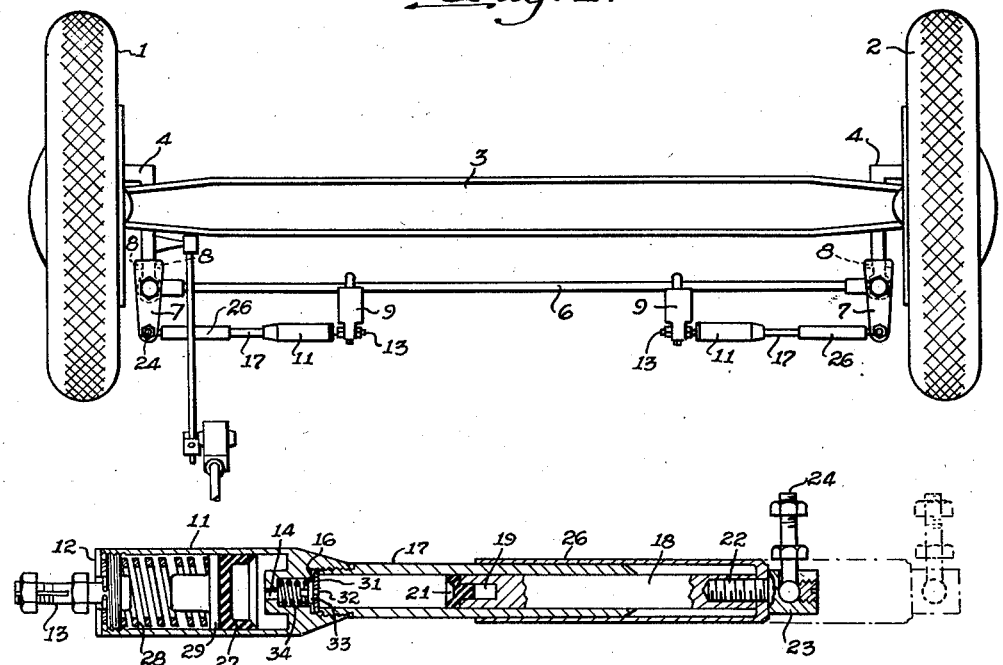
Fig. 2.
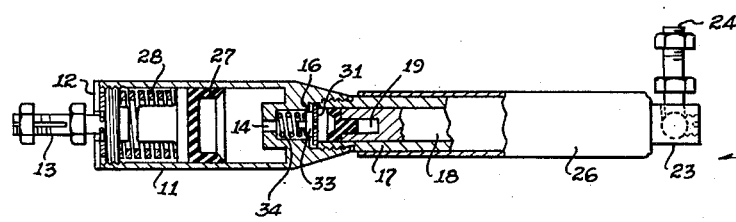
Fig. 3.
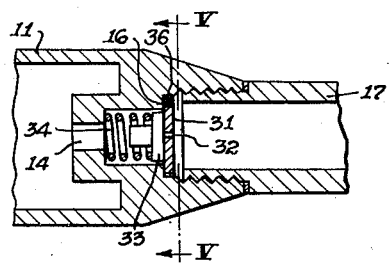
Fig. 4.
Fig. 5.
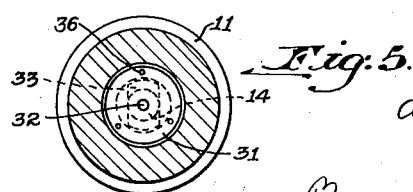
WITNESSES:
E. J. Maloney
V. A. Peckham
INVENTOR
Andrew F. Ross
BY
Brown, Critchlow & Flick
his ATTORNEYS.

Patented Aug. 31, 1948

2,448,468

UNITED STATES PATENT OFFICE 2,448,468

STEERING STABILIZER

Andrew F. Ross, Pittsburgh, Pa., assignor to Safety Steering Stabilizer Company, Pittsburgh, Pa., a corporation of Pennsylvania Application August 18, 1945, Serial No. 611,292

5 Claims. (Cl. 280—90)

1

This invention relates to steering stabilizers for motor vehicles to prevent sudden impacts against their steerable wheels from turning those wheels sufficiently to throw the vehicle out of control.

It is among the objects of this invention to provide a steering stabilizer which is of simple and rugged construction, which is small and compact, which will not leak, which is very sensitive, which does not interfere with normal steering, and which is protected from damage.

In accordance with this invention a piston is disposed in a hydraulic cylinder from one end of which it projects. The projecting end of the piston is connected to either a steering pitman arm or to the tie rod that connects the pitman arms in the steering mechanism of a motor vehicle. A fluid reservoir is secured to the end of the cylinder opposite the piston and is connected to the tie rod in case the piston is fastened to the pitman arm; otherwise it is connected to the arm. The fluid reservoir and the hydraulic cylinder are connected by a fluid passage toward which a plunger in the reservoir is urged by a spring behind it. Disposed in the fluid passage are valve means that normally permit substantially unrestricted flow of fluid through the passage in both directions, but which are operative to momentarily close the passage when a sudden increase in the fluid pressure in the cylinder occurs. By closing the passage in this manner, a severe impact of a wheel against an object can not turn the wheel. Preferably, the valve means include a floating disc in the fluid passage adapted to be pressed against a seat therein by a sudden increase in fluid pressure in the cylinder. This disc is provided with a by-pass opening on the reservoir side of which there is a valve that is backed up by a spring and normally spaced from the disc. Immediately after the floating disc has been forced against the valve and its seat by a sudden increase in fluid pressure in the cylinder, thereby arresting movement of the piston into the cylinder, the fluid pressure, acting through the by-pass, forces the valve from the disc so that it is only a moment before the fluid pressure on opposite sides of the disc is equalized and the disc leaves its seat without interfering with normal steering of the vehicle by the operator.

The preferred embodiment of the invention is illustrated in the accompanying drawings in which Fig. 1 is a plan view of the front axle of a motor vehicle showing the pivoted front wheels connected by a tie rod to which a pair

2 of my steering stabilizers are connected; Fig. 2 is an enlarged vertical section through the stabilizer located at the right hand end of the connecting rod in Fig. 1; Fig. 3 is a view similar to Fig. 2, but showing the piston at its innermost position in the cylinder; Fig. 4 is an enlarged fragmentary view of the adjoining ends of the reservoir and cylinder with the floating disc pressed against the seat in the connecting passage; and Fig. 5 is a transverse section taken on the line V—V of Fig. 4.

Referring to Fig. 1 of the drawings, a pair of wheels 1 and 2 are shown pivotally mounted on the opposite ends of the front axle 3 of a motor vehicle, such as a truck. This invention is not limited to any particular type of motor vehicle, but can be used with any which have wheels that are steered by an operator or driver. Each of the wheels is connected by a steering pitman arm 4 to a tie rod 6 behind the axle. At the joint where each pitman arm is pivotally connected to the tie rod an extension member 7 is mounted. This member is secured to the pivot pin at the joint, and the front end of the member is provided with a pair of downwardly projecting lugs 8 that straddle the pitman arm. The extension member extends rearwardly behind the tie rod so that its rear end will be swung in an arc toward and away from the center of the tie rod when the wheels are turned. A pair of brackets 9 are rigidly mounted on the tie rod a short distance from its ends, and extending from each bracket to the rear end of the adjacent extension member 7 is a steering stabilizer. The right hand stabilizer functions when something on the road attempts to turn the wheels to the right, while the left hand stabilizer prevents the wheels from suddenly being thrown to the left. The two stabilizers are alike, so only one of them will be described.

Referring now to the stabilizer in Fig. 2, the outer end of a cylindrical fluid reservoir 11 is closed by a screw plug 12 from which a threaded stud 13 projects for connecting the reservoir to one of the brackets 9 on the tie rod. The opposite end of the reservoir is provided with an axial bore 14 having three different diameters. Thus, the inner end of the bore is quite small, the central portion is larger, and the outer end portion is still larger and is connected to the intermediate portion by a radial surface 16 which forms an annular seat that faces the outer end of the bore. A short distance in front of this seat the bore is threaded to receive the threaded end of a hydraulic cylinder 17 that is in the form of a short tube. With the cylinder screwed into the bore as far as it will go, there remains an annular space between the seat and the adjacent end of the cylinder for a purpose to be described presently.

Fitting snugly but slidably in cylinder 17 is a piston which includes a rod-like element 18 provided in its inner end with an axial recess 19 in which is mounted a cup-like head 21 of resilient material for preventing escape of fluid from the cylinder along the piston. The piston projects from the cylinder and has a threaded axial bore in its outer end in which a stud 22 is screwed. Integral with the outer end of this stud is a block 23 in which the spherical end of another threaded stud 24 is mounted. This stud is connected to the projecting rear end of an extension member 7. Telescoped over the hydraulic cylinder is a sleeve 26 the outer end of which is provided with a radial flange that is clamped between stud block 23 and the outer end of the adjoining piston. This sleeve shields the piston from stones and other objects on the road that otherwise might strike the piston and possibly score it or damage it in some other way so that fluid might escape from the cylinder along the piston.

Disposed inside reservoir 11 adjacent the passage 14 that connects it with the hydraulic cylinder is a cup 27 made of flexible material so that fluid can not escape past it. A heavy coil spring 28 is compressed between this cup and the screw plug 12 at the outer end of the reservoir. The inner end of this spring bears against a follower 29 that engages the cup. It will be seen that with the cylinder and reservoir part full of fluid, such as oil, movement of the piston inwardly of the cylinder will force oil through passage 14 into the reservoir and thereby push cup 27 backwardly against the resistance of the spring. On the other hand, when the piston moves outwardly in the cylinder the spring 28, pressing against the cup, will cause sufficient oil to be forced out of the reservoir to keep the cylinder full of oil. During normal steering of the vehicle, oil is constantly flowing back and forth in this manner through the passage connecting the reservoir and cylinder.

It is a feature of this invention that the piston is prevented from moving inwardly of the cylinder when one or the other of the wheels strikes something that attempts to swing the wheels in the direction that otherwise would cause such movement of the piston. Accordingly, valve means are mounted in the passage between the reservoir and cylinder where they normally permit substantially unrestricted flow of fluid therethrough in both directions, but which momentarily close the passage when a sudden increase in fluid pressure in the cylinder occurs due to the impact of the wheels against something that tends to turn them.

The valve means include a circular floating disc 31 located in fluid passage 14 with its marginal area loosely disposed in the annular space between seat 16 and the adjacent end of the cylinder so that the fluid in the stabilizer can flow back and forth past the periphery of the disc. Any impact of the wheels against an object that will attempt to swing them to the right tends to move the piston in the right hand stabilizer toward the reservoir and thereby causes a sudden increase in fluid pressure in the cylinder which forces the disc against the seat, as shown in Fig. 4. This seals the cylinder so that the piston can not move further into it, and thus prevents the wheels from turning toward the right and throwing the vehicle out of control. An impact that tends to swing the wheels to the left will have the same effect in the left hand stabilizer. On the other hand, the wheels can not be turned quickly enough by the driver through the steering gear to build up sufficient pressure in the cylinder to cause the disc to be seated, so the disc remains away from its seat even when the driver turns the wheels far enough to the right to move the piston to its innermost position, as shown in Fig. 3.

In order to break the seal formed by disc 31 striking its seat, so that immediately after the wheels have passed the deflecting object the driver will be able to turn the wheels in the same direction toward which they tended to be deflected, the center of the disc is provided with a very small by-pass opening 32 through which the high pressure fluid in the cylinder can flow in order to equalize the pressure on both sides of the disc almost instantly so as to permit it to unseat itself. However, it is necessary that this by-pass be closed when the disc is thrust against its seat; otherwise, the disc will not seal the cylinder at that time. For this purpose a valve 33 having a flat head from which a stem projects is held at the outer end of the intermediate portion of passage 14 by means of a coil spring 34. As indicated in Fig. 5, the head of this valve is narrow so that it does not close the fluid passage. The length of the spring is such that the face of the valve normally is located in front of seat 16, but it is not pressed against the disc which is free to move away from the valve so that fluid can flow through the by-pass if the piston is suddenly pulled toward the outer end of the cylinder. However, when a sudden increase in fluid pressure in the cyilnder forces the disc toward seat 16, the disc first strikes valve 33 which closes the by-pass. Before the fluid pressure can act through the by-pass to unseat the valve, the disc accomplishes its purpose of sealing the cylinder and thereby arrests movement of the piston toward the reservoir. Immediately thereafter, the pressure in the cylinder forces the valve away from the disc by-pass and thereby allows fluid to flow through it and equalize the pressure on its opposite sides. This breaks the seal, and the disc leaves seat 16, whereby unimpeded steering can be resumed immediately.

To aid the fluid in flowing back and forth between reservoir 11 and cylinder 17 during normal steering, disc 31 is provided near its periphery with a plurality of openings 36. These openings are closed by seat 16 when the disc is forced against it, as shown in Fig. 5, but the disc never is forced that tightly against the adjacent end of cylinder 17. Besides, due to the inside of cylinder 17 being larger than the inner diameter of seat 16, openings 36 could not be sealed by the end of the cylinder anyway.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. A steering stabilizer adapted to be connected to a steering arm member at a steerable wheel of a motor vehicle and to the tie rod member connected to the steering arm member, comprising a hydraulic cylinder, a piston therein projecting from one end thereof, means on the projecting end of the piston adapted to connect it to one of said members, a fluid reservoir secured to the opposite end of the cylinder, means on the reservoir adapted to connect it to the other of said members, said reservoir and cylinder being connected by a fluid passage provided with a seat facing the piston, a floating disc in said passage adapted to be pressed against said seat by a sudden increase in fluid pressure in the cylinder, said disc being provided with a by-pass opening, a spring-biased valve on the reservoir side of the disc for momentarily closing said by-pass when the disc strikes said seat, a plunger in said reservoir, and a spring urging the plunger toward said passage.

2. A steering stabilizer adapted to be connected to a steering arm member at a steerable wheel of a motor vehicle and to the tie rod member connected to the steering arm member, comprising a hydraulic cylinder, a piston therein projecting from one end thereof, means on the projecting end of the piston adapted to connect it to one of said members, a fluid reservoir secured to the opposite end of the cylinder, means on the reservoir adapted to connect it to the other of said vehicle members, said reservoir being provided with a passage connecting it with the cylinder, said passage having an enlarged cross section at the end of the cylinder to form an annular recess provided with axially spaced radial side walls, the side wall at the reservoir side of the recess being a seat, a floating disc in said passage with its marginal area loosely disposed in said recess where it is adapted to be forced against said seat by a sudden increase in fluid pressure in the cylinder, said disc being provided with a by-pass opening, a spring-biased valve on the reservoir side of the disc for momentarily closing said by-pass when the disc strikes said seat, a plunger in said reservoir, and a spring urging the plunger toward said passage.

3. A steering stabilizer adapted to be connected to a steering arm member at a steerable wheel of a motor vehicle and to the tie rod member connected to the steering arm member, comprising a hydraulic cylinder, a piston therein projecting from one end thereof, means on the projecting end of the piston adapted to connect it to one of said members, a fluid reservoir provided with a fluid chamber and having at one end an axial bore communicating with said chamber, the outer end portion of said bore being enlarged in cross section to form an annular seat facing the outer end of the bore, means on the reservoir adapted to connect it to the other of said members the inner end of said cylinder being rigidly mounted in said reservoir bore with the end face of the cylinder spaced from said seat, a floating disc in said passage with its marginal area loosely disposed in the annular space between said end face and seat, said disc being adapted to be forced against said seat by a sudden increase in fluid pressure in the cylinder, said disc being provided with a by-pass opening, a spring-biased valve on the reservoir side of the disc for momentarily closing said by-pass when the disc strikes said seat, a plunger in said reservoir, and a spring urging the plunger toward said passage.

4. A steering stabilizer adapted to be connected to a steering arm member at a steerable wheel of a motor vehicle and to the tie rod member connected to the steering arm member, comprising a hydraulic cylinder, a piston therein projecting from one end thereof, means on the projecting end of the piston adapted to connect it to one of said members, a fluid reservoir secured to the opposite end of the cylinder, means on the reservoir adapted to connect it to the other of said members, said reservoir and cylinder being connected by a fluid passage provided with a seat facing the piston, a floating disc in said passage adapted to be pressed against said seat by a sudden increase in fluid pressure in the cylinder, the disc being smaller in diameter than said passage to provide clearance around the disc, said disc being provided with a plurality of openings through it near its periphery in position to be closed by said seat when the disc is pressed against it, the disc also being provided with a central by-pass opening, and a spring-biased valve on the reservoir side of the disc for holding said by-pass closed momentarily after the disc strikes said seat.

5. A steering stabilizer adapted to be connected to a steering arm member at a steerable wheel of a motor vehicle and to the tie rod member connected to the steering arm member, comprising a hydraulic cylinder, a piston therein projecting from one end thereof, means on the projecting end of the piston adapted to connect it to one of said members, a fluid reservoir secured to the opposite end of the cylinder, means on the reservoir adapted to connect it to the other of said members, said reservoir being provided with a passage connecting it with the cylinder, said passage having an enlarged cross section at the end of the cylinder to form an annular recess provided with axially spaced radial side walls, the side wall at the reservoir side of the recess being an annular seat having an inner diameter smaller than the inner diameter of the opposite side wall of the recess, a floating disc in said passage with its marginal area loosely disposed in said recess where it is adapted to be forced against said seat by a sudden increase in fluid pressure in the cylinder, said disc being provided with a plurality of circumferentially spaced openings therethrough near its periphery in position to be closed by said seat when the disc is forced against it, said openings communicating with said cylinder when the disc is adjacent said opposite side wall of the recess, the disc also being provided with a central by-pass opening, and a spring-biased valve on the reservoir side of the disc for holding said by-pass closed momentarily after the disc strikes said seat.

ANDREW F. ROSS.

REFERENCES CITED

The following references are of record in the file of this patent:

UNITED STATES PATENTS

| Number | Name | Date |
|---|---|---|
| 1,508,391 | Greenwood | Sept. 16, 1924 |
| 2,096,650 | Del Rio | Oct. 19, 1937 |
| 2,264,111 | Briggs | Nov. 25, 1941 |
| 2,314,404 | Katcher | Mar. 23, 1943 |
| 2,410,176 | Magrum | Oct. 29, 1946 |